March 19, 1968     J. F. NEWMAN ET AL     3,373,790

PNEUMATIC TIRE TREAD

Filed Sept. 14, 1965

United States Patent Office 3,373,790
Patented Mar. 19, 1968

3,373,790
PNEUMATIC TIRE TREAD
James F. Newman, St. Clair Shores, and John W. Taylor, Grosse Pointe Farms, Mich., assignors to Uniroyal, Inc., a corporation of New Jersey
Filed Sept. 14, 1965, Ser. No. 487,111
3 Claims. (Cl. 152—209)

ABSTRACT OF THE DISCLOSURE

Groove cracking and lug tearing where lug elements are divided by narrow grooves may be avoided by undercutting the leading edges of the lug elements adjacent the narrow grooves.

---

This invention relates to pneumatic tire treads and, more particularly, to such treads of the traction type suitable for use in mud and snow tires on passenger cars.

Traction tire treads incorporate bars or lugs separated by wide grooves, which may, for example, be arranged transversely, diagonally or circumferentially with respect to the circumferences of the tire treads. This type of tread is inherently noisy and unsuitable for tires for passenger car use. In order to adapt these traction principles to passenger tires, such as mud and snow tires, the traction lugs were divided into smaller elements and separated by narrow grooves of full depth. This revision minimized the noise by raising the resonance of the pitch sequence without detracting from the good traction qualities. This revised tread structure produced more flexible elements but with less filleting in the bases of the narrow grooves, which resulted in longitudinal groove cracking and tearing at the sharp fillet formed by angularly joined grooves. The wider groove was not susceptible to cracking because the fillet was sufficiently large to distribute and bear the stresses. It is for this reason that it is preferred not to undercut the wider major grooves of lug tires but only to undercut the narrow minor grooves. Conventional mud and snow tire treads usually have two or three major grooves or channels which follow a zig-zag path circumferentially around the tire. These major grooves are partially interrupted by lateral minor grooves of narrower widths to form the lug patterns. The narrow grooves have ordinarily been designed with sidewalls at 90° to the outer tread surface at the crown of the tire or with a 1° taper to provide a maximum radius at the bottom of the grooves for resistance to groove cracking and lug tearing. However, at driving speeds suitable for expressway driving, passenger mud and snow tires have been subject to longitudinal groove cracking, lug tearing and so-called chunking of tread stock.

It is an object of the invention therefore to provide a new and improved pneumatic traction tire tread.

It is another object of the invention to provide a new and improved pneumatic traction tire tread which is not subject to groove cracking, lug tearing and chunking of tread stock at high passenger car driving speeds.

In accordance with the invention, in a pneumatic tire, a tread comprises a tread layer having lug projections therefrom separated by intersecting grooves, a plurality of said grooves having base portions of generally bulbous cross-section and a plurality of said lug projections having edges with undercut rounded portions at the intersections of said grooves.

The foregoing and other objects, characteristics and advantages of the invention will be more fully understood from the following detailed description of preferred embodiments thereof, when read with reference to the accompanying drawing, wherein.

Figure 1:
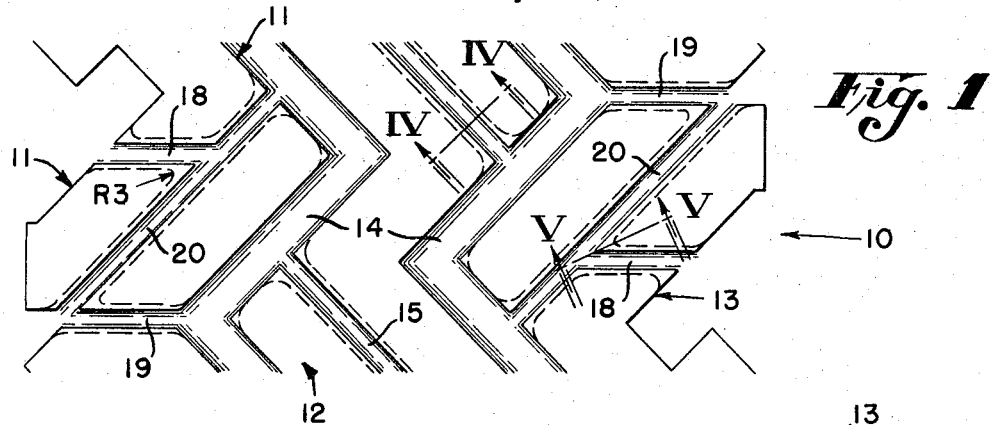
FIG. 1 is a plan view of a portion of a traction tire tread having major and minor grooves of equal maximum depth.
Figure 2:
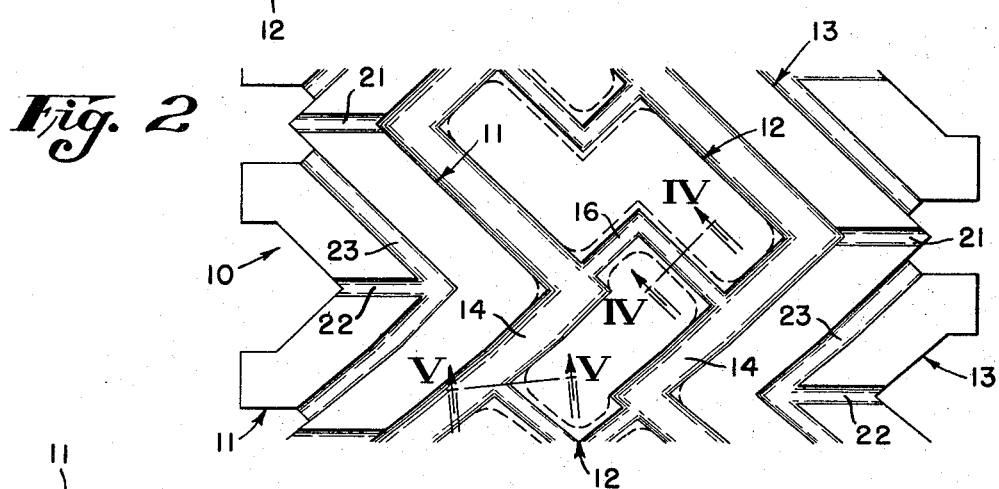
FIG. 2 is a plan view of a portion of another embodiment of a traction tire tread having major and minor grooves in the center region of equal maximum depth and minor grooves in the adjoining side portions of a secondary substantially lesser depth.
Figure 3:
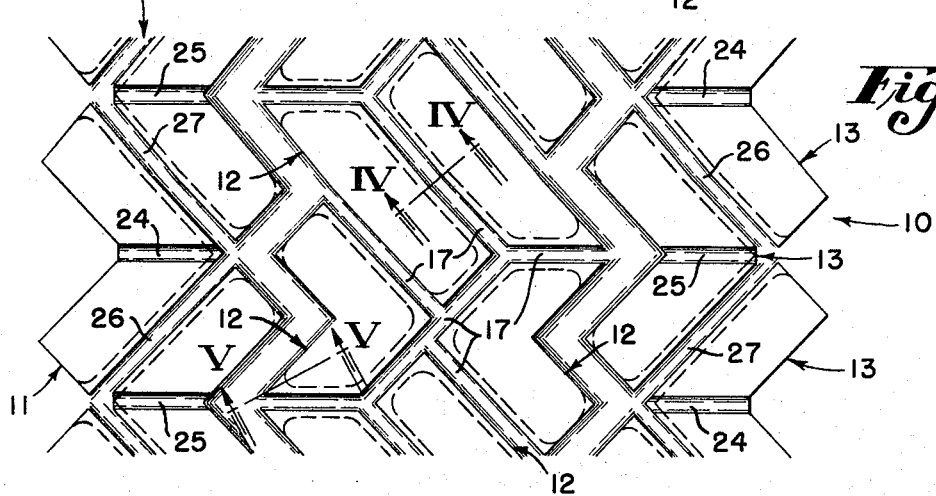
FIG. 3 is a plan view of a third embodiment of a portion of a traction tire tread having major and minor grooves in the center region of equal maximum depth and minor grooves in the adjoining side portions of both maximum and secondary depths.

Referring now to the drawing, similar elements of the FIGS. 1, 2, and 3 embodiments are indicated by the same reference numerials. Referring to FIGS. 1, 2, and 3, traction tire treads 10 have circumferential lug rows 11, 12 and 13 separated by wide major grooves 14 and disposed in various patterns, these examples of which are shown in FIGS. 1, 2, and 3 of the drawing. The large portions of the lug of center row 12 of each tread have been divided in different ways. The lugs have generally been separated by minor narrow grooves each of which are undercut. In the FIG. 1 embodiment, the lug of row 12 has been divided by a straight undercut minor groove 15. In the FIG. 2 embodiment, the lug of row 12 is divided by an angular undercut minor groove 16. In the FIG. 3 embodiment, the lug of row 12 is divided by a multiple of straight undercut minor grooves 17 that join together angularly. The outer lug rows 11 and 13 have also been divided by narrow minor grooves. The outer lug rows 11 ano 13 of the FIG. 1 tread are divided by transverse undercut minor grooves 18 and 19 and a diagonal undercut minor groove 20. The outer lug rows 11 and 13 of the FIG. 2 tread are divided by transverse secondary minor grooves 21 and 22 and V-shaped secondary minor grooves 23. The secondary minor grooves are of a lesser sub-surface dep h and require no undercutting because the rubber flexing stresses are present primarily at the plane of the greatest groove depth, providing the secondary grooves are sufficiently shallow, such as half depth or less. The outer rows of lugs of the FIG. 3 tread are divided by transverse secondary minor grooves 24 and 25 and diagonal undercut minor grooves 26 and 27.

Figures 4, 5:
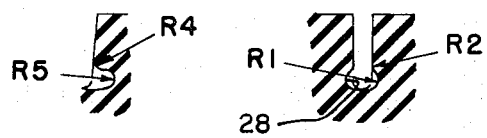
FIG. 4 is a sectional view taken on lines IV—IV of each of the FIGS. 1, 2, and 3 embodiments.
FIG. 5 is a sectional view taken on lines V—V of each of the FIGS. 1, 2, and 3 embodiments.

The references that have been made above to undercut minor grooves can best be described by referring to FIG. 4 of the drawing. In prior tire treads, minor grooves were terminated at the prescribed depth by a full radius fi let as shown in dotted line. This construction placed the rubber stresses caused by flexing on the very limited filleted surface which is reduced by one-half in the direction of shear. The bulb-like undercut 28 and the dual tangintial filleting of surface portions R1 and R2 into the sidewall of the groove and into each other distribute the stresses over a greater surface area into the sidewall of the groove at least to the tangent point of surface portion R2 with the sidewall of the groove, thereby minimizing groove cracking. Although an undercut which is generally bulbous in cross-section is preferable, any generally curved undercut will perform this function.

Another feature of the invention involves undercut rounding of sharp corners and is best described by referring to FIG. 5 of the drawing. A sharp corner edge formed by the intersection of the fillet is shown in dotted line as the corner edge would be if unrounded. The unrounded corner construction undesirably concentrates the rubber stresses caused by flexing on the sharp fillet edge of the lug element. The combined undercut convex rounding of the corner indicated by R3 (see FIG. 1) and the filleting of surface portions R4 and R5 distribute the stresses over a greater area in two directions, thereby eliminating corner tearing which results in block chunking. Neither of the above-mentioned features of the invention, when practiced separately, individually overcomes the defects of former traction type tires. In combination, however, the features are effective to impart high quality to a traction tire tread, rendering the tread suitable for passenger car use at high operating speeds without being subject to lug tearing or groove cracking.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. In a pneumatic lug tire, a tread comprising a tread layer having wide lug projections which are separated by intersecting wide and narrow grooves, wherein only said narrow grooves have base portions which are undercut at the junction of said lug projections with said base portions, said undercut being generally curved in cross-section.

2. In a pneumatic lug tire, a tread comprising a tread layer having wide lug projections which are separated by intersecting wide and narrow grooves which intersect at sharp corners, wherein only said narrow grooves have base portions which are undercut at the junction of said lug projections with said base portions, said undercut being generally curved in cross-section; and wherein a plurality of said lug projections have undercut rounded portions at the sharp corners thereof.

3. A tread as defined in claim 2 wherein said generally curved cross-sectioned base portions are formed by dual tangential filleting into the sidewall of each of said grooves at the intersection of said lug projections and said tread layer.

References Cited

UNITED STATES PATENTS

| | | | |
|---|---|---|---|
| 1,413,190 | 4/1922 | Rapson | 152—209 |
| 2,264,767 | 12/1941 | Ofensend | 152—209 |

FOREIGN PATENTS 744,231  1/1933  France.

ARTHUR L. LA POINT, *Primary Examiner.*

Y. P. SCHAEVITZ, C. B. LYON, C. W. HAEFELE,
*Assistant Examiners.*